Aug. 11, 1925.
H. BOLLE
1,548,863
DRIVING CHAIN
Filed Nov. 5, 1923
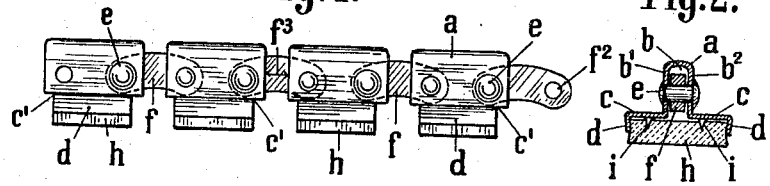
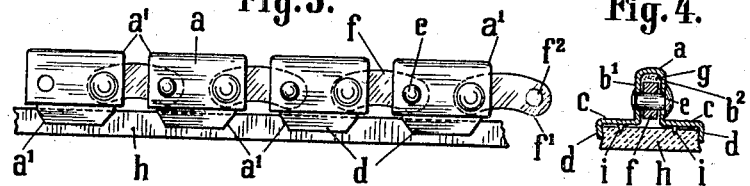
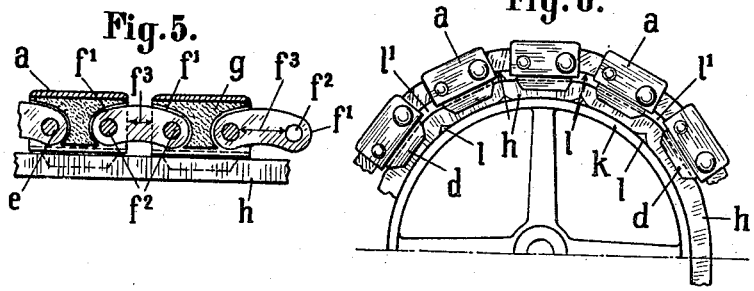
Inventor:
H. Bolle
By Marks & Clerk
Attys.

Patented Aug. 11, 1925.

1,548,863

UNITED STATES PATENT OFFICE.

HERMANN BOLLE, OF BERLIN-LICHTERFELDE, GERMANY.

DRIVING CHAIN.

Application filed November 5, 1923. Serial No. 673,018.

*To all whom it may concern:*

Be it known that I, HERMANN BOLLE, a citizen of the German Republic, residing at No. 54 Zehlendorferstrasse, Berlin-Lichterfelde, Germany, have invented certain new and useful Improvements in Driving Chains, of which the following is a specification.

This invention consists in improvements in link belts of the block type.

An improved link belt according to this invention is of simple construction and it combines the advantages of the usual leather driving belts with the advantages of the usual metal driving chains, without entailing the disadvantages of either.

In the improved link belt the driving blocks which are formed by bending a single piece of sheet metal and are articulated together by flat link bars are made with a cavity the sides of which are bent at their lower ends outwardly so as to form two horizontal pressing members adapted to exert a uniform pressure upon frictional bodies during the working of the link belt. These frictional bodies are held at predetermined distances on the said pressing members by holding devices. The said pressing members are provided with lateral retaining or gripping flanges affording lateral support to, and guiding the frictional member or members in combination with said holding devices. In the cavity of each driving block, the aforesaid flat link bars for connecting the driving blocks, are articulated to the latter by means of joint pins at designed distances apart so as to leave interspaces of such nature that, when the link belt is running on belt pulleys of suitable form and dimensions, the angles between any two mutually articulated driving blocks will always be such as will prevent the occurrence of injurious strains in the frictional bodies. The latter may be constituted for instance by a plurality of separate specially shaped pieces, or by a continuous belt.

The frictional body which is held and gripped in each driving block, and is guided in the latter at an angle that obviates at every instant any injurious strain, may consist either of a separate body (leather plate, leather sleeve &c.) mounted in each driving block, or it may consist of a single body (leather belt or the like) which connects all the driving blocks together.

With the object of effecting an easy and automatic adjustment of the angle between every two driving blocks for the purpose of preventing the occurrence of any injurious strain on the driving blocks, and thereby ensuring that these driving blocks shall at all times be pressed smoothly upon the belt pulleys, the corners of the driving blocks may be bevelled, or the pressing members may be cut away or recessed in correspondence with the distance of the flat link bars from the joint pins.

A hollow space between the two pressing members may allow slight bending of the frictional body inwardly, if the link-belt is working on crowned pulleys.

With the object of ensuring a smooth uniform working of the improved driving chain, a pad of felt or the like charged with lubricant may be placed in the cavity of each driving block, for the purpose of effecting a permanent and automatic lubrication of the joints and joint pins, and also preventing dust, &c., from penetrating into the cavities of the driving blocks.

The improved link belt of this invention is a new tensile device wherein the occurring peripheral forces or tensile strains are taken entirely by the driving blocks, and the frictional body or bodies is or are unaffected by said peripheral forces or tensile strains.

Several embodiments of this invention are illustrated by way of examples in the accompanying drawings in which:—

Figure 1 is a side elevation of one constructional form of the improved link belt comprising a plurality of separate frictional bodies.

Figure 2 is a vertical cross section of a driving block, after removal of the lubricating pad.

Figure 3 is a side elevation of a modification of the improved driving chain wherein the frictional bodies are constituted by a single continuous frictional body which connects all the driving blocks together.

Figure 4 is a vertical cross section of one of the driving blocks shown in Figure 3.

Figure 5 is a longitudinal section of two driving blocks, showing the arrangement of the flat link bars and joint pins, and also of the lubricating pads.

Figure 6 is a side elevation of a driving chain of the kind illustrated in Figure 3 located on a belt pulley, the occurring angles of inclination being indicated.

Referring to the drawings, the improved link belt comprises a plurality of hollow driving blocks $a$, each formed by bending a single piece of sheet metal and whereof $b$ indicates the cavity in each block. Each driving block is provided with two pressing and abutment members $c\ c$ which are formed by bending the lower sides $b^1$, $b^2$ at an angle to the main portion of the block. These pressing members $c\ c$ for the frictional body or bodies $h$ are bent to form lateral flanges $d$, $d$. $e$ are the joint pins which are located in the sides $b^1$, $b^2$ of the cavity $b$ of the driving block $a$. The flat link bars $f$ are movably mounted on the joint pins $e$. The residual internal space which is not occupied by the head $f^1$ of the flat link bars $f$ in the cavity of the block $a$, is filled in each block by a lubricating pad $g$ (Figs. 4 and 5), so that the movements of the rounded heads $f^1$ of the flat link bars relatively to the lubricating pad $g$, cause an automatic lubrication of the bar eyes $f^2$ and their joint pins $e$.

In the link belt shown in Figure 1 the frictional bodies $h$ consist of separate bodies, which are inserted separately in each driving block $a$ and are preferably secured therein, for instance releasably or removably. These securing and fixing devices may consist, as indicated in Figure 4, of pointed pins $i$ or the like for maintaining the frictional bodies in a predetermined distance within the lateral flanges $d$, $d$, while the lateral flanges $d$, $d$ give to each such frictional body $h$ the requisite lateral support and guidance.

The constructional form shown in Figure 3 is almost identical with that shown in Figure 1, with the exception that the frictional body $h$ has the form of a continuous belt of leather or the like, which connects all the links of each link belt, but is secured and guided in the separate links in an analogous manner.

A small opening or a hollow space $x$ between the pressing members $c$, $c$ allows a slight bending of the frictional body, if the link-belt is used on crowned pulleys.

In Figure 6 the link belt according to Figure 3 is shown as laid on a belt pulley. It will be seen that in this case the separate driving blocks $a$ press by means of their pressing and abutment members $c$, $c$ the frictional bodies, in this case the belt $h$, uniformly against the belt pulley $k$ and guide it by means of the lateral flanges $d$. In order to eliminate the internal stresses, which occur, when a thick belt of leather or the like runs round a belt pulley $k$ of small diameter, where the outer layer of the belt has to expand to a certain extent and the inner layer to be compressed to a considerably greater extent, each driving block $a$ is given such a form, for instance by adopting dimensions for the pressing members $c$, $c$ to suit the driving block $a$ (Fig. 1) or by providing inclined surfaces $a^1$ (Fig. 3) and also by the distance $f^3$ of the flat link bars $f$ from the block $a$ or finally by the position of the pins $e$, that spaces $l^1$ are formed (Fig. 6), so that the compressed part of the belt $h$ can give into the spaces $l^1$, as is indicated at $l$ and by the arrow, whereby the flexibility of the link belt is considerably increased, while the strength is in no way diminished, the peripheral forces and tensional stresses being taken up by the driving chain alone and the frictional body or bodies being relieved of all such stresses.

The constructional forms described above and shown in the drawings are only given by way of example and it is expressly stated, that they are only intended to be such and not to limit the invention in any way, many modifications in the dimensions, material used and the numbers being possible without in any way departing from the spirit of the invention.

What I claim is:—

1. In a link-belt of the type comprising driving blocks connected together by pin-jointed flat link bars, the combination of a hollow driving block having the sides of its cavity bent at their lower ends to constitute pressing members, lateral flanges on said pressing members, a frictional body located between said flanges so as to be laterally supported and guided by the flanges, devices for holding said frictional body at predetermined distances on the pressing members and pin-joints for articulating said flat link bars to adjacent driving blocks located in the cavity of the driving block so as to leave between adjacent driving blocks empty spaces that will allow every two adjacent driving blocks when working on a belt pulley, to enclose at all times an angle that will ensure that no injurious stresses will be set up in said frictional body.

2. In a link-belt of the type comprising driving blocks connected together by pin-jointed flat link bars, the combination of a hollow driving block having the sides of its cavity bent at their lower ends to constitute pressing members, lateral flanges on said pressing members, a frictional body located between said flanges so as to be laterally supported and guided by the flanges, said frictional body constituting one of a plurality of such frictional bodies mounted on their respective driving blocks, devices for holding said frictional body at predetermined distances on the pressing members and pin-joints for articulating said flat link bars to adjacent driving blocks, located in the cavity of the driving block so as to leave between adjacent driving blocks empty spaces that will allow every two adjacent driving blocks when working on a belt pulley, to enclose at all times an angle that will ensure that no injurious stresses will be set up in said frictional body.

3. In a link-belt of the type comprising driving blocks connected together by pin-jointed flat link bars, the combination of a hollow driving block having the sides of its cavity bent at their lower ends to constitute pressing members, lateral flanges on said pressing members, a frictional body located between said flanges so as to be laterally supported and guided by the flanges said frictional body constituting one of a plurality of such frictional bodies mounted on their respective driving blocks united together to form a single continuous belt of frictional bodies, devices for holding said frictional body at predetermined distances on the pressing members and pin-joints for articulating said flat link bars to adjacent driving blocks, located in the cavity of the driving block so as to leave between adjacent driving blocks empty spaces that will allow every two adjacent driving blocks when working on a belt pulley, to enclose at all times an angle that will ensure that no injurious stresses will be set up in said frictional body.

4. In a link-belt as claimed in claim 1, the combination therewith of bevelled edges on said driving blocks in correspondence with the distance of the flat link bars from their joint pins.

5. In a link-belt as claimed in claim 1, the combination therewith of cut-away portions or recesses in the pressing members in correspondence with the distances of the flat link bars from their joint pins.

6. In a link-belt as claimed in claim 1, the combination of a hollow space or a small opening between the two pressing members, so that the middle part of the frictional bodies can give into this space, if the link-belt is working on crowned pulleys.

In testimony whereof I have signed my name to this specification.

HERMANN BOLLE.